March 3, 1936.    W. B. MOORE    2,032,490
ROLL MOUNTING
Filed Nov. 10, 1934
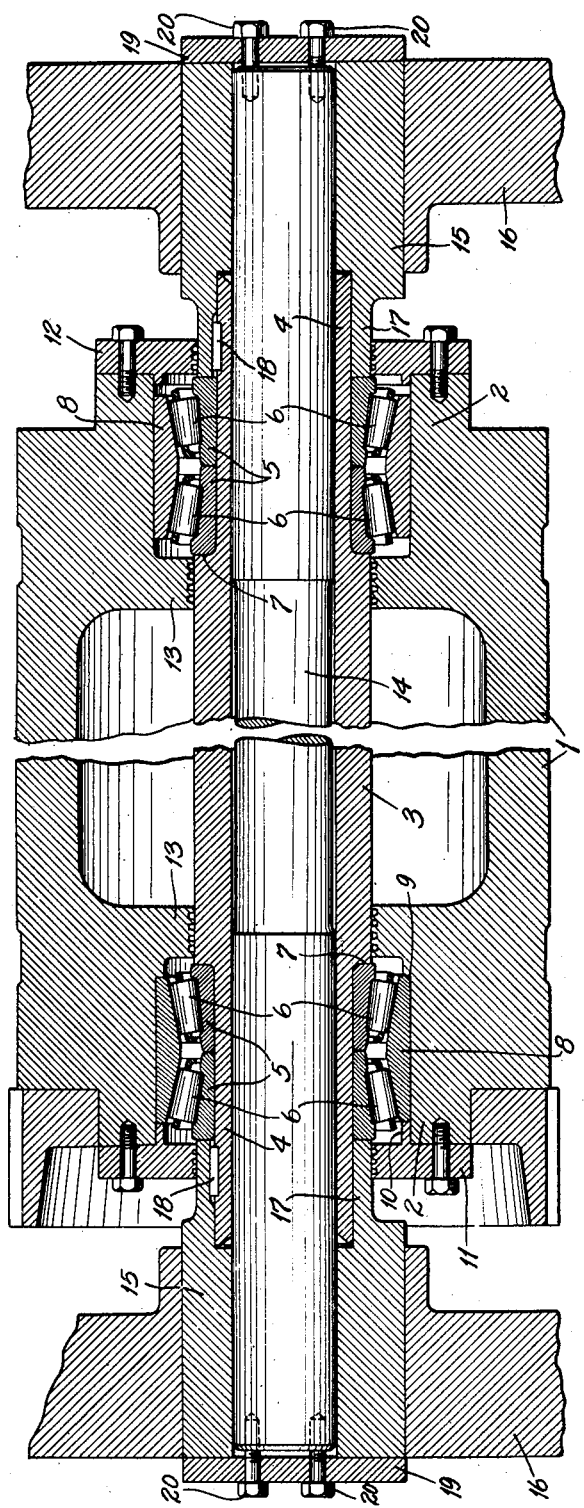
INVENTOR:
Whitley B. Moore
by Caulter Gravely
HIS ATTORNEYS.

Patented Mar. 3, 1936

2,032,490

UNITED STATES PATENT OFFICE 2,032,490

ROLL MOUNTING

Whitley B. Moore, Canton, Ohio, assignor to The Timken Roller Bearing Company, Canton, Ohio, a corporation of Ohio Application November 10, 1934, Serial No. 752,409

8 Claims. (Cl. 308—208)

My invention relates to the antifriction mounting of rolls, particularly to the mounting of the cylinders of an offset press. The surfaces of such cylinders must be accurately finished and they require refinishing from time to time. With cylinder mountings of the usual construction, the inner races of the cylinder supporting bearings are mounted directly on an axle that extends continuously from side frame to side frame of the press with its ends fixed in openings therein; and the cylinder is given its final grinding or other finishing operation with the cylinder, bearings and axle assembled together and mounted in a finishing machine. Such a construction, however, requires the cylinder, bearings and axle to be disassembled after the cylinder surface has been finished and then re-assembled when installed in the press. Obviously, this re-assembly of the cylinder, bearings and axle after finishing the cylinder surface involves great risk of lack of concentricity as between the cylinder and the axle on which it is mounted. It is an important object of the present invention, therefore, to provide a construction which permits the assembled cylinder, bearings and axle to be installed in the press as a unit with the parts in the same positions that they had during the finishing of the cylinder surface, thereby insuring concentricity of the cylinder and bearings when installed in the press.

Other objects of the invention are a strong and rigid construction and one permitting press-fitting of the inner bearing members.

The invention consists in the antifriction roll mounting and in the parts and combinations and arrangements of parts hereinafter described and claimed.

The accompanying drawing is a longitudinal sectional view through one of the cylinders of an offset press provided with an antifriction bearing mounting embodying my invention.

The ordinary offset lithographic press includes a plate cylinder on which is mounted a zinc or aluminum plate, a blanket cylinder on which is mounted a blanket of rubber or the like that receives the impression from the plate and an impression cylinder over which the paper passes in receiving the impression from the rubber blanket. Each of these cylinders must have a peripheral surface that is accurately and smoothly finished and that is concentric with the axis of the bearings on which it is supported and the mounting of antifriction bearings therein has presented a serious problem. The drawing illustrates one of these cylinders and the invention is applicable to all of said cylinders as well as to the rolls or cylinders of other apparatus.

A hollow roll or cylinder 1 mounted between spaced side frame members 16 has hub portions 2 near its ends in which are mounted antifriction bearings, double row taper roller bearings being illustrated. Extending through the cylinder is a hollow axle 3, which is shorter than the space between said side frame members, has reduced end portions 4 on which are mounted the inner bearing members 5 of said roller bearings, the drawing illustrating a separate cone 5 for each series of tapered rollers 6, said cones being arrange with their small ends abutting and with the innermost cone 5 against the shoulder 7 at the reduced end portion of the hollow axle. The bearing cones 5 are preferably press-fitted on the hollow axle 3. The tapered rollers 6 are mounted on said cones 5 and a duplex cup 8 or outer bearing member is provided for the two series of rollers of each bearing. The duplex cup 8 at one end is seated against a shoulder 9 in said cylinder 1 and accurately positioned by means of a sleeve 10 projecting from an end closure ring 11 at the end of the cylinder. The duplex cup at the other end floats in the cylinder 1, there being no portion of the cylinder in contact with either end of the cup. A closure ring 12 is provided at this end of the cylinder. Inwardly of each bearing, the cylinder is provided with an annular rib 13 closely surrounding said hollow axle and preventing escape of lubricant from the bearing.

Extending through the hollow axle 3 is a shaft or beam 14 whose ends extend into mounting blocks 15 that are disposed in openings in the frame members 16. Said mounting blocks 15 have sleeve portions 17 fitting over the ends of the hollow axle 3 and secured thereto by keys 18, the ends of said sleeves engaging the outermost bearing cones 5 and the ends of the hollow axle terminating short of the inner ends of said sleeve portions. Said mounting blocks 15 have caps 19 over their ends which are secured to said shaft 14 by means of screws 20. Thus, by tightening up the screws 20, the parts of the device are drawn up tight.

The cylinder, bearings and hollow axle are assembled before the cylinder is given its final grinding or other finishing operation. Thus, the ends of the hollow axle may be mounted in the chucks of a finishing machine and after the cylinder finishing operation, the assembled parts may be installed as a unit in the press in the same positions that they had during the finishing operation, thereby not only insuring accurate finishing of the surface of the cylinder but also concentricity of the bearings when in operation. The shaft or beam is relieved of the bearing load, serving merely as a tie member for the axle assembly.

Obviously, numerous changes may be made without departing from my invention; and I do not wish to be limited to the precise arrangement shown and described.

What I claim is:

1. An antifriction roll mounting comprising a hollow roll, a hollow axle extending therethrough, bearings mounted on said hollow axle, frame members, mounting blocks in said frame members, a shaft extending through said hollow axle and into said mounting blocks, caps over the ends of said mounting blocks and screws extending through said caps into the ends of said shaft.

2. An antifriction roll mounting comprising a hollow roll, a hollow axle extending therethrough, taper roller bearings interposed between said hollow axle and said roll, each bearing including a pair of cones pressed on said axle and held at each end, rollers thereon, and a duplex cup for said rollers in said roll, frame members, mounting blocks in said frame members and a shaft extending through said hollow axle and into said mounting blocks.

3. An antifriction roll mounting comprising a hollow roll, a hollow axle extending therethrough, taper roller bearings interposed between said hollow axle and said roll, each bearing including a pair of cones pressed on said axle and held at each end, rollers thereon, and a duplex cup for said rollers in said roll, one of said cups being held at each end and the other being free in said roll, frame members, mounting blocks in said frame members and a shaft extending through said hollow axle and into said mounting blocks.

4. An antifriction roll mounting comprising a hollow roll, a hollow axle extending therethrough, taper roller bearings mounted in said roll and on said hollow axle, each including a pair of bearing cones of which the innermost is seated against a shoulder provided on said axle, frame members, mounting blocks in said frame members and a shaft extending through said hollow axle and into said mounting blocks, said mounting blocks having sleeves fitting over the ends of said hollow axle.

5. An antifriction roll mounting comprising a hollow roll, a hollow axle extending therethrough, taper roller bearings mounted in said roll and on said hollow axle, each including a pair of bearing cones of which the innermost is seated against a shoulder provided on said axle, frame members, mounting blocks in said frame members and a shaft extending through said hollow axle and into said mounting blocks, said mounting blocks having sleeves fitting over the ends of said hollow axle and keyed thereto.

6. An antifriction roll mounting comprising a hollow roll, a hollow axle extending therethrough, taper roller bearings mounted in said roll and on said hollow axle, each including a pair of bearing cones of which the innermost is seated against a shoulder provided on said axle, frame members, mounting blocks in said frame members, and a shaft extending through said hollow axle and into said mounting blocks, said mounting blocks having sleeves fitting over the ends of said hollow axle and abutting against the outermost bearing cones.

7. In an offset press, spaced frame members, a hollow cylinder disposed between said frame members, a hollow axle extending through said cylinder and having reduced end portions, taper roller bearings interposed between said cylinder and the innermost portions of said reduced portions of said hollow axle with their inner bearing members positioned against the shoulders formed by the body of the hollow axle at the inner ends of said reduced portions, mounting blocks in said frames for receiving and supporting the ends of said hollow axle, caps on the ends of said mounting blocks, a shaft in said hollow axle and screws extending through said caps into said shaft.

8. An antifriction roll mounting comprising spaced frame members, an axle disposed between and extending transversely of said frame members, the length of said axle being less than the space between said frame members, a hollow roll on said axle, bearings interposed between said axle and said hollow roll, and members extending inwardly from frame members and supporting the adjacent ends of said axle.

WHITLEY B. MOORE.